United States Patent
Poirel et al.

(10) Patent No.: US 10,803,178 B2
(45) Date of Patent: *Oct. 13, 2020

(54) GENERICIZED DATA MODEL TO PERFORM A SECURITY ANALYTICS OPERATION

(71) Applicant: Forcepoint, LLC, Austin, TX (US)

(72) Inventors: Chris Poirel, Baltimore, MD (US); Ann Irvine, Baltimore, MD (US); Russell Snyder, Baltimore, MD (US); Chris Puderbaugh, Falls Church, VA (US)

(73) Assignee: Forcepoint LLC, Austin, TX (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/799,339

(22) Filed: Oct. 31, 2017

(65) Prior Publication Data

US 2019/0130112 A1    May 2, 2019

(51) Int. Cl.
G06F 21/57    (2013.01)
G06F 16/26    (2019.01)

(52) U.S. Cl.
CPC ............ G06F 21/577 (2013.01); G06F 16/26 (2019.01); *G06F 2221/034* (2013.01)

(58) Field of Classification Search
CPC ... G06F 16/26; G06F 21/577; G06F 2221/034
USPC .......................................................... 726/25
See application file for complete search history.

(56) References Cited

U.S. PATENT DOCUMENTS

| | | | |
|---|---|---|---|
| 6,072,875 A | 6/2000 | Tsudik | |
| 7,694,150 B1 | 4/2010 | Kirby | |
| 7,725,565 B2 | 5/2010 | Li et al. | |
| 7,933,960 B2 | 4/2011 | Chen et al. | |
| 8,181,253 B1 | 5/2012 | Zaitsev et al. | |
| 8,312,064 B1 | 11/2012 | Gauvin | |
| 8,424,061 B2 | 4/2013 | Rosenoer | |
| 8,484,066 B2 | 7/2013 | Miller et al. | |
| 8,490,163 B1 | 7/2013 | Harsell et al. | |
| 8,826,443 B1 | 9/2014 | Raman et al. | |
| 8,892,690 B2 | 11/2014 | Liu et al. | |
| 9,043,905 B1 | 5/2015 | Allen et al. | |

(Continued)

FOREIGN PATENT DOCUMENTS

WO    WO-2019153581 A1    8/2019

OTHER PUBLICATIONS

NPL Search Results (Year: 2020).*

(Continued)

*Primary Examiner* — Syed A Zaidi

(74) *Attorney, Agent, or Firm* — Terrile, Cannatti & Chambers; Stephen A. Terrile

(57) ABSTRACT

A method, system and computer-usable medium for performing security analytics comprising receiving a stream of data from a data source; preprocessing the stream of data identify entity information and event information from the stream of data; transforming the entity information into transformed entity data and the event information into transformed event data; the transforming conforming to a genericized data model; storing the transformed entity data and the transformed event data in a security analytics data repository; and, performing a security analytics operation on the transformed entity data and the transformed event data.

20 Claims, 4 Drawing Sheets

(56) References Cited

U.S. PATENT DOCUMENTS

| | | |
|---|---|---|
| 9,137,318 B2 | 9/2015 | Hong |
| 9,166,999 B1* | 10/2015 | Kulkarni ............ H04L 63/1433 |
| 9,246,941 B1 | 1/2016 | Gibson et al. |
| 9,262,722 B1 | 2/2016 | Daniel |
| 9,342,553 B1 | 5/2016 | Fuller |
| 9,485,266 B2 | 11/2016 | Baxley et al. |
| 9,542,650 B2 | 1/2017 | Lospinoso et al. |
| 9,596,146 B2 | 3/2017 | Coates et al. |
| 9,665,854 B1 | 5/2017 | Burger et al. |
| 9,755,913 B2 | 9/2017 | Bhide et al. |
| 9,762,582 B1 | 9/2017 | Hockings et al. |
| 9,798,883 B1 | 10/2017 | Gil et al. |
| 9,935,891 B1 | 4/2018 | Stamos |
| 9,977,824 B2 | 5/2018 | Agarwal et al. |
| 10,096,065 B2 | 10/2018 | Little |
| 10,187,369 B2 | 1/2019 | Caldera et al. |
| 10,237,298 B1 | 3/2019 | Nguyen et al. |
| 10,275,671 B1 | 4/2019 | Newman |
| 10,282,702 B2 | 5/2019 | Paltenghe et al. |
| 10,284,601 B1 | 5/2019 | Bar-Menachem et al. |
| 10,320,813 B1 | 6/2019 | Ahmed et al. |
| 10,341,391 B1 | 7/2019 | Pandey et al. |
| 10,417,454 B1 | 9/2019 | Marom et al. |
| 10,417,653 B2 | 9/2019 | Milton et al. |
| 10,419,428 B2 | 9/2019 | Tunnell et al. |
| 10,432,669 B1 | 10/2019 | Badhwar et al. |
| 10,579,281 B2 | 3/2020 | Cherubini et al. |
| 2002/0112015 A1* | 8/2002 | Haynes ............ H04L 63/0428 709/206 |
| 2004/0034582 A1 | 2/2004 | Gilliam et al. |
| 2004/0044613 A1 | 3/2004 | Murakami et al. |
| 2005/0198099 A1 | 9/2005 | Motsinger et al. |
| 2006/0048209 A1 | 3/2006 | Shelest et al. |
| 2006/0053476 A1 | 3/2006 | Bezilla et al. |
| 2006/0112111 A1 | 5/2006 | Tseng et al. |
| 2006/0117172 A1* | 6/2006 | Zhang ............ G06F 9/4416 713/2 |
| 2006/0129382 A1 | 6/2006 | Anand et al. |
| 2006/0195905 A1 | 8/2006 | Fudge |
| 2006/0225124 A1 | 10/2006 | Kolawa et al. |
| 2007/0043703 A1* | 2/2007 | Bhattacharya ......... G06F 16/24 |
| 2007/0121522 A1 | 5/2007 | Carter |
| 2007/0225995 A1* | 9/2007 | Moore ............... G06Q 50/163 705/314 |
| 2007/0234409 A1 | 10/2007 | Eisen |
| 2008/0168002 A1 | 7/2008 | Kagarlis et al. |
| 2008/0168135 A1* | 7/2008 | Redlich ............ G06Q 10/10 709/204 |
| 2008/0168453 A1 | 7/2008 | Hutson et al. |
| 2008/0198453 A1 | 8/2008 | LaFontaine et al. |
| 2008/0244741 A1 | 10/2008 | Gustafson et al. |
| 2009/0182872 A1 | 7/2009 | Hong |
| 2009/0228474 A1 | 9/2009 | Chiu et al. |
| 2009/0300712 A1 | 12/2009 | Kaufmann et al. |
| 2010/0057662 A1 | 3/2010 | Collier et al. |
| 2010/0058016 A1 | 3/2010 | Nikara et al. |
| 2010/0094767 A1 | 4/2010 | Miltonberger |
| 2010/0094818 A1 | 4/2010 | Farrell et al. |
| 2010/0107255 A1 | 4/2010 | Eiland et al. |
| 2010/0146622 A1 | 6/2010 | Nordstrom et al. |
| 2010/0275263 A1 | 10/2010 | Bennett et al. |
| 2011/0167105 A1 | 7/2011 | Ramakrishnan et al. |
| 2011/0307957 A1 | 12/2011 | Barcelo et al. |
| 2012/0046989 A1 | 2/2012 | Baikalov et al. |
| 2012/0047575 A1 | 2/2012 | Baikalov et al. |
| 2012/0079107 A1 | 3/2012 | Williams et al. |
| 2012/0110087 A1 | 5/2012 | Culver et al. |
| 2012/0137367 A1 | 5/2012 | Dupont et al. |
| 2012/0210158 A1* | 8/2012 | Akiyama ............ G06F 21/554 714/2 |
| 2012/0259807 A1 | 10/2012 | Dymetman |
| 2013/0013550 A1 | 1/2013 | Kerby |
| 2013/0054433 A1 | 2/2013 | Giard et al. |
| 2013/0081141 A1* | 3/2013 | Anurag ............... G06F 21/55 726/23 |
| 2013/0097662 A1* | 4/2013 | Pearcy ................ H04L 63/20 726/1 |
| 2013/0102283 A1 | 4/2013 | Lau et al. |
| 2013/0132551 A1 | 5/2013 | Bose et al. |
| 2013/0174259 A1* | 7/2013 | Pearcy ............ H04L 41/0893 726/25 |
| 2013/0238422 A1 | 9/2013 | Saldanha |
| 2013/0305358 A1 | 11/2013 | Gathala et al. |
| 2013/0317808 A1 | 11/2013 | Kruel et al. |
| 2013/0320212 A1 | 12/2013 | Valentino et al. |
| 2013/0340035 A1 | 12/2013 | Uziel et al. |
| 2014/0075004 A1 | 3/2014 | Van Dusen et al. |
| 2014/0096215 A1 | 4/2014 | Hessler |
| 2014/0199663 A1 | 7/2014 | Sadeh-Koniecpol et al. |
| 2014/0205099 A1 | 7/2014 | Christodorescu et al. |
| 2014/0325634 A1 | 10/2014 | Iekel-Johnson et al. |
| 2015/0082430 A1 | 3/2015 | Sridhara et al. |
| 2015/0113646 A1 | 4/2015 | Lee et al. |
| 2015/0154263 A1 | 6/2015 | Boddhu et al. |
| 2015/0161386 A1 | 6/2015 | Gupta et al. |
| 2015/0199511 A1 | 7/2015 | Faile, Jr. et al. |
| 2015/0199629 A1 | 7/2015 | Faile, Jr. et al. |
| 2015/0205954 A1 | 7/2015 | Jou et al. |
| 2015/0220625 A1 | 8/2015 | Cartmell et al. |
| 2015/0256550 A1 | 9/2015 | Taylor et al. |
| 2015/0269383 A1 | 9/2015 | Lang et al. |
| 2015/0288709 A1 | 10/2015 | Singhal et al. |
| 2015/0324559 A1 | 11/2015 | Boss et al. |
| 2015/0324563 A1 | 11/2015 | Deutschmann et al. |
| 2015/0350902 A1 | 12/2015 | Baxley et al. |
| 2016/0021117 A1 | 1/2016 | Harmon et al. |
| 2016/0036844 A1 | 2/2016 | Kopp et al. |
| 2016/0078362 A1 | 3/2016 | Christodorescu et al. |
| 2016/0092774 A1 | 3/2016 | Wang et al. |
| 2016/0164922 A1 | 6/2016 | Boss et al. |
| 2016/0226914 A1 | 8/2016 | Doddy et al. |
| 2016/0232353 A1 | 8/2016 | Gupta et al. |
| 2016/0261621 A1 | 9/2016 | Srivastava et al. |
| 2016/0277360 A1 | 9/2016 | Dwyier et al. |
| 2016/0277435 A1 | 9/2016 | Salajegheh et al. |
| 2016/0286244 A1 | 9/2016 | Chang et al. |
| 2016/0300049 A1 | 10/2016 | Guedalia et al. |
| 2016/0308890 A1* | 10/2016 | Weilbacher ......... H04L 63/1416 |
| 2016/0330219 A1 | 11/2016 | Hasan |
| 2016/0335865 A1 | 11/2016 | Sayavong et al. |
| 2016/0371489 A1 | 12/2016 | Puri et al. |
| 2017/0032274 A1 | 2/2017 | Yu et al. |
| 2017/0053280 A1 | 2/2017 | Lishok et al. |
| 2017/0063888 A1* | 3/2017 | Muddu ............ G06F 3/04847 |
| 2017/0070521 A1 | 3/2017 | Bailey et al. |
| 2017/0104790 A1 | 4/2017 | Meyers et al. |
| 2017/0116054 A1 | 4/2017 | Boddhu et al. |
| 2017/0155669 A1 | 6/2017 | Sudo et al. |
| 2017/0230418 A1 | 8/2017 | Amar et al. |
| 2017/0255938 A1 | 9/2017 | Biegun et al. |
| 2017/0279616 A1 | 9/2017 | Loeb et al. |
| 2017/0286671 A1 | 10/2017 | Chari et al. |
| 2017/0331828 A1 | 11/2017 | Caldera et al. |
| 2018/0004948 A1 | 1/2018 | Martin et al. |
| 2018/0018456 A1 | 1/2018 | Chen et al. |
| 2018/0024901 A1 | 1/2018 | Tankersley et al. |
| 2018/0025273 A1 | 1/2018 | Jordan et al. |
| 2018/0082307 A1 | 3/2018 | Ochs et al. |
| 2018/0091520 A1 | 3/2018 | Camenisch et al. |
| 2018/0121514 A1 | 5/2018 | Reisz et al. |
| 2018/0145995 A1 | 5/2018 | Roeh et al. |
| 2018/0191745 A1* | 7/2018 | Moradi ................ G06F 21/552 |
| 2018/0191857 A1 | 7/2018 | Schooler et al. |
| 2018/0248863 A1 | 8/2018 | Kao et al. |
| 2018/0285363 A1 | 10/2018 | Dennis et al. |
| 2018/0288063 A1 | 10/2018 | Koottayi et al. |
| 2018/0295141 A1 | 10/2018 | Solotorevsky |
| 2018/0336353 A1 | 11/2018 | Manadhata et al. |
| 2018/0341758 A1 | 11/2018 | Park et al. |
| 2018/0341889 A1 | 11/2018 | Psalmonds et al. |
| 2018/0349684 A1 | 12/2018 | Bapat et al. |
| 2019/0014153 A1 | 1/2019 | Lang et al. |

(56) References Cited

U.S. PATENT DOCUMENTS

| | | |
|---|---|---|
| 2019/0052660 A1 | 2/2019 | Cassidy et al. |
| 2019/0392419 A1 | 12/2019 | Deluca et al. |
| 2020/0034462 A1 | 1/2020 | Narayanaswamy et al. |
| 2020/0089692 A1 | 3/2020 | Tripathi et al. |

OTHER PUBLICATIONS

L. F. Lafuerza et al., Exact Solution of a Stochastic Protein Dynamics Model with Delayed Degradation, Phys. Rev. E 84, 051121, Nov. 18, 2011, pp. 1-8.

Zoubin Ghahramani, Bayesian nonparametrics and the probabilistic approach to modelling, Philosophical Transactions A of the Royal Society, vol. 371 Issue: 1984, Published Dec. 31, 2012, pp. 1-20.

Elena Zheleva et al., Higher-order Graphical Models for Classification in Social and Affiliation Networks, NIPS 2010 Workshop on Networks Across Disciplines: Theory and Applications, Whistler BC, Canada, 2010, pp. 1-7.

Varun Chandola et al., Anomaly Detection: A Survey, ACM Computing Surveys, vol. 41, No. 3, Article 15, Jul. 2009, pp. 15.1-58.1.

Judea Pearl, The Causal Foundations of Structural Equation Modeling, Technical Report R-370, Computer Science Department, University of California, Los Angeles, also Chapter 5, R. H. Hoyle (Ed.), Handbook of Structural Equation Modeling, New York, Guilford Press, Jun. 4, 2012, pp. 68-91.

Yueh-Hsuan Chiang, Towards Large-Scale Temporal Entity Matching, Dissertation Abstract, University of Wisconsin-Madison, 2013.

Furong Li, Linking Temporal Records for Profiling Entities, 2015, SIGMOD '15 Proceedings of the 2015 ACM SIGMOD International Conference on Management of Data, pp. 593-605, https://users.soe.ucsc.edu/~tan/papers/2015/modf445-li.pdf.

Peter Christen et al., Adaptive Temporal Entity Resolution on Dynamic Databases, Apr. 2013, http://users.cecs.anu.edu.au/~Peter.Christen/publications/christen2013pakdd-slides.pdf.

Wkipedia, Categorical Distribution, edited Jul. 28, 2018, https://en.wikipedia.org/wiki/Categorical_distribution.

Wikipedia, One-Hot, edited May 22, 2018, https://en.wikipedia.org/wiki/One-hot.

Marinescu, Dan C., Cloud Computing and Computer Clouds, University of Central Florida, 2012, pp. 1-246.

Mesaros et al., Latent Semantic Analysis in Sound Event Detection, 19th European Signal Processing Conferen (EUSIPCO 2011), pp. 1307-1311.

Sean Barnum, Standardized Cyber Threat Intelligence Information with the Structured Threat Information eXpression (STIX) Whitepaper v1.1 (Feb. 20, 2014).

Xiang Sun et al., Event Detection in Social Media Data Streams, IEEE International Conference on Computer and Information Technology; Ubiquitous Computing and Communications; Dependable, Automatic and Secure Computing; Persuasive Intelligence and Computing, pp. 1711-1717, Dec. 2015.

Mesaros et al., Latent Semantic Analysis in Sound Event Detection, 19th European Signal Processing Conference (EUSIPCO 2011), pp. 1307-1311, 2011.

Crandall et al., Inferring Social Ties from Geographic Coincidences, PNAS, vol. 107, No. 52, 2010, pp. 22436-22441, 2010.

Ross et al., Bully Prevention in Positive Behavior Support, Journal of Applied Behavior Analysis, 42(4), pp. 747-759, 2009.

Matt Klein, How to Erase Your iOS Device After Too Many Failed Passcode Attempts, https://www.howtogeek.com/264369/ how-to-erase-your-ios-device-after-too-many-failed-passcode-attempts/, Jul. 28, 2016.

GITHUB, The Z3 Theorem Prover, retrieved from internet May 19, 2020, https://github.com/Z3Prover/z3.

John Backes et al., Semantic-based Automated Reasoning for AWS Access Policies using SMT, 2018 Formal Methods in Computer Aided Design (FMCAD), Oct. 30-Nov. 2, 2018 Ittps://d1.awsstatic.com/Security/pdfs/ Semantic_Based_Automated_Reasoning_for_AWS_Access_Policies_Using_SMT.pdf.

\* cited by examiner

GENERICIZED DATA MODEL TO PERFORM A SECURITY ANALYTICS OPERATION

BACKGROUND OF THE INVENTION

Field of the Invention

The present invention relates in general to the field of computers and similar technologies, and in particular to software utilized in this field. Still more particularly, it relates to a method, system and computer-usable medium for transforming heterogeneous entity and event information to conform to a genericized data model used to perform a security analytics operation.

Description of the Related Art

Users interact with physical, system, data, and services resources of all kinds, as well as each other, on a daily basis. Each of these interactions, whether accidental or intended, poses some degree of security risk. However, not all behavior poses the same risk. Furthermore, determining the extent of risk corresponding to individual events associated with such interactions between entities can be challenging.

For example, one user's access of an organization's proprietary resources may pose a higher risk than another user accessing the same resource. Likewise, an authorized user modifying a particular data asset may pose less risk than an unauthorized user retrieving, viewing and transferring the same data asset to yet another user. Consequently, indiscriminately applying the same policy to all user behavior instead of adjusting security oversight accordingly may result in inefficient utilization of security system resources.

More particularly, physical security approaches have typically focused on monitoring and restricting access to tangible resources. Likewise, cyber security approaches have included network access controls, intrusion detection and prevention systems, machine learning, big data analysis, software patch management, and secured routers. One thing such approaches have in common is they typically generate entity and event data that can be analyzed for security vulnerabilities or malicious activities. However, such data is generally heterogeneous and disparate. Furthermore, it may conform to substantially different data models.

SUMMARY OF THE INVENTION

A method, system and computer-usable medium are disclosed for transforming heterogeneous entity and event information to conform to a genericized data model used to perform a security analytics operation.

More specifically, in certain embodiments, the invention relates to a method, system and computer-usable medium for performing security analytics comprising receiving a stream of data from a data source; preprocessing the stream of data identify entity information and event information from the stream of data; transforming the entity information into transformed entity data and the event information into transformed event data; the transforming conforming to a genericized data model; storing the transformed entity data and the transformed event data in a security analytics data repository; and, performing a security analytics operation on the transformed entity data and the transformed event data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method, system and computer-usable medium are disclosed for transforming heterogeneous entity and event information to conform to a genericized data model used to perform a security analytics operation. Certain embodiments of the invention reflect an appreciation that it is not uncommon for data scientists to develop multiple case/switch statements to ensure that information originating from various data sources is modeled appropriately and accurately. Likewise, certain embodiments reflect an appreciation that it is often advantageous to simplify data management, such as implementing a single mapping schema and a corresponding index, rather than multiple schemas, each with their associated indices.

Certain embodiments of the invention reflect an appreciation that specially-developed logic needs to ensure that correct indices are generated from such data streams and they are queried properly. Likewise, certain embodiments of the invention reflect an appreciation that certain data fields are rationalized and resolved to ensure accurate searches. As an example, two data models may use the term "body" to refer to content, yet a third data model may use the term "content" itself. Certain embodiments of the invention likewise reflect an appreciation that a simplified data model can assist in making business logic easier to implement, maintain and extend.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a mobile device such as a tablet or smartphone, a connected "smart device," a network appliance, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more storage systems, one or more network ports for communicating externally, as well as various input and output (I/O) devices, such as a keyboard, a mouse, and a graphics display.

Figure 1:
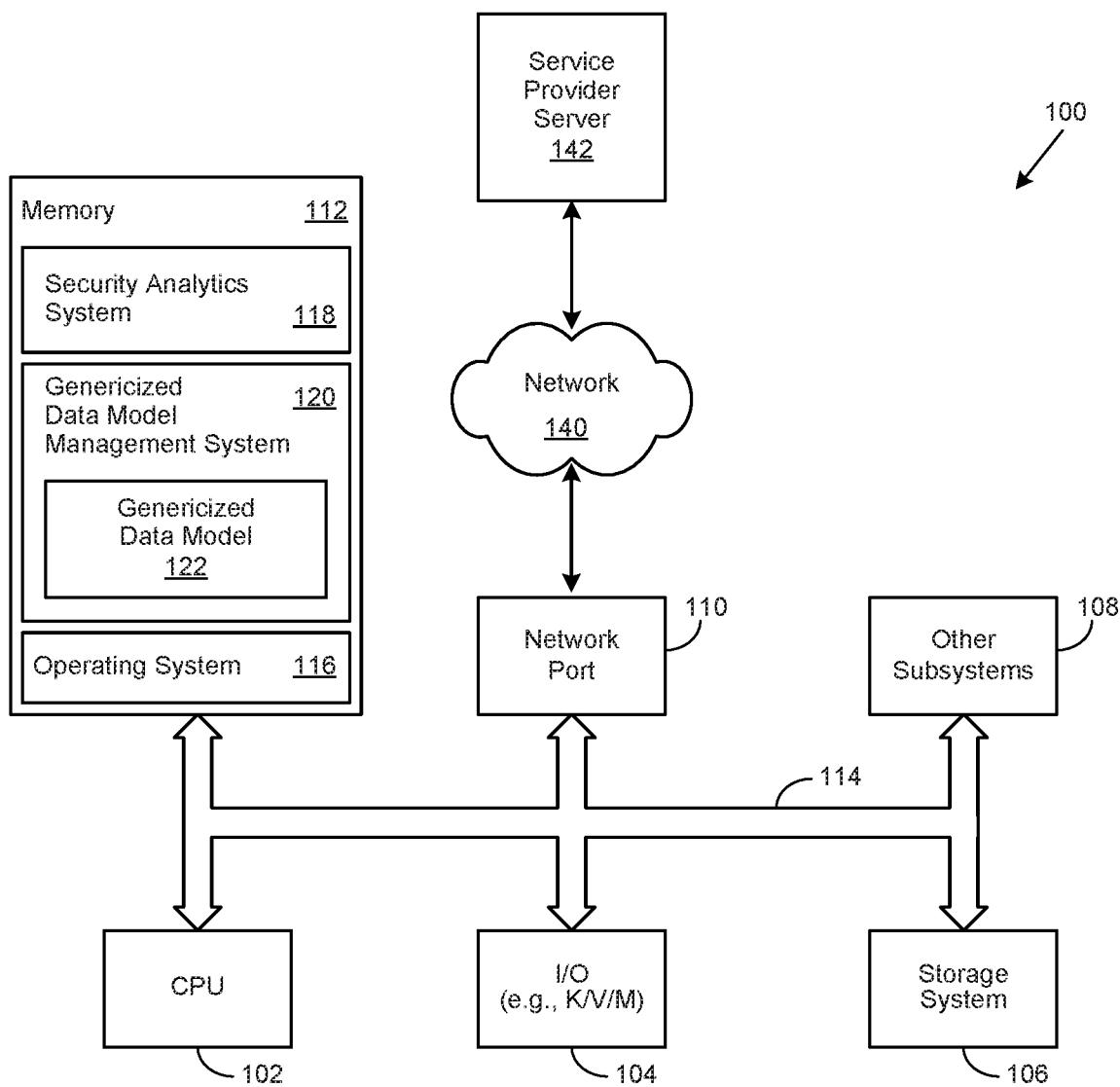
FIG. 1 depicts an exemplary client computer in which the present invention may be implemented.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a storage system 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further includes operating system (OS) 116 and in various embodiments may also include a security analytics system 118 and a data model management system 120. In certain embodiments, the data model management system 120 may include a genericized data model 122. In one embodiment, the information handling system 100 may be able to download the security analytics system 118, the data model management system 120, and the genericized data model 122, or a combination thereof, from the service provider server 142. In another embodiment, the security analytics system 118, the data model management system 120, and the genericized data model 122, or a combination thereof, may be provided as a service from the service provider server 142.

In certain embodiments, the security analytics system 118, the data model management system 120, and the genericized data model 122, or a combination thereof, perform a security analytics operation. In certain embodiments, the data model management system 120 and the genericized data model 122 perform a data model management operation. In certain embodiments, the security analytics operation and the data model management operation, or a combination thereof, improves processor efficiency, and thus the efficiency of the information handling system 100, by performing security analytics operations, data model management operations, or a combination thereof.

Figure 2:
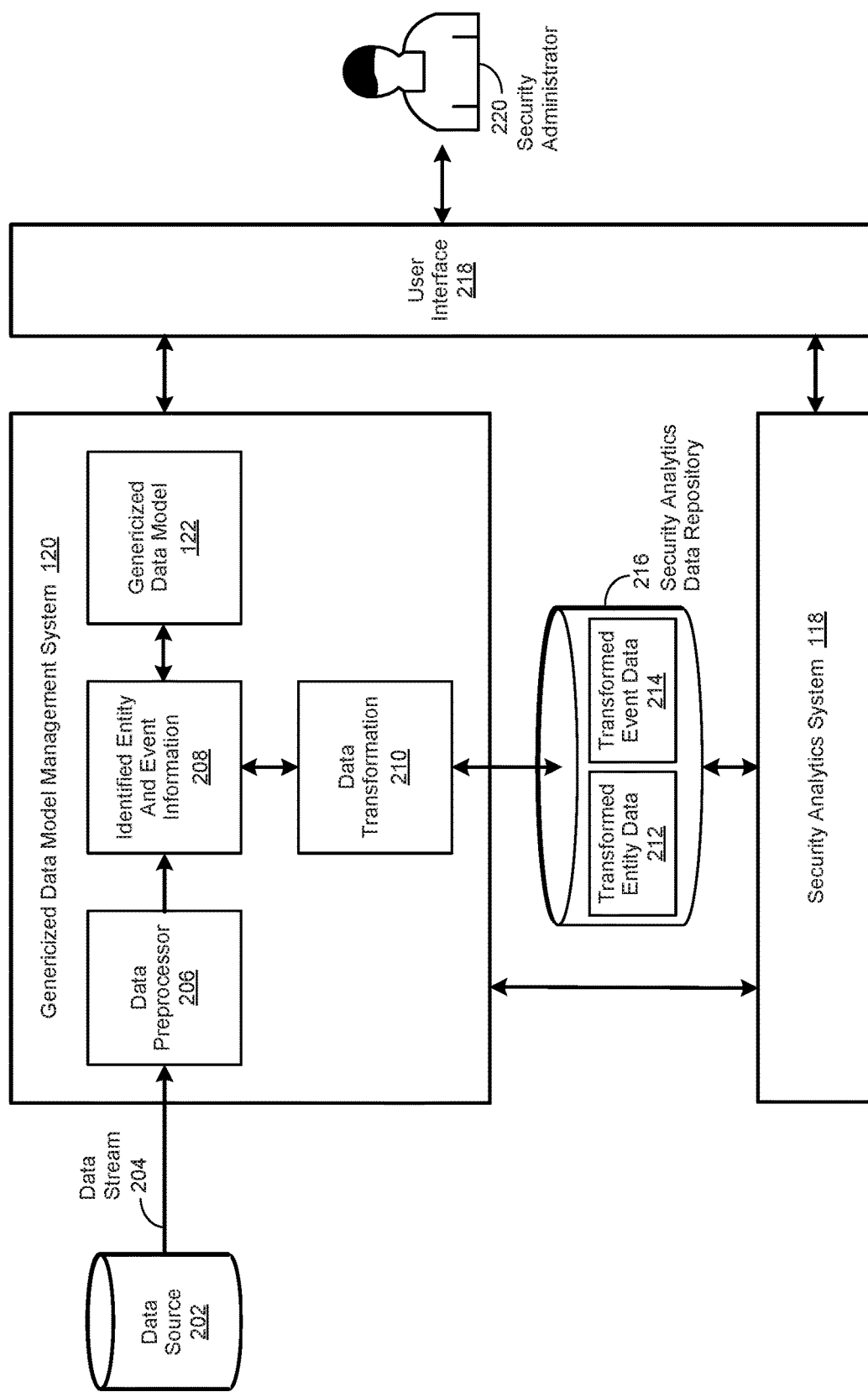
FIG. 2 is a simplified block diagram of a genericized data model management system.

As will be appreciated, once the information handling system 100 is configured to perform the security analytics operations and the data model management operations, or a combination thereof, the information handling system 100 becomes a specialized computing device specifically configured to perform the security analytics operations and the data model management operations, or a combination thereof, and is not a general purpose computing device. Moreover, the implementation of the security analytics system 118, the data model management system 120, and the genericized data model 122, or a combination thereof, on the information handling system 100 improves the functionality of the information handling system 100 and provides a useful and concrete result of performing security analytics operations and data model management operations, or a combination thereof FIG. 2 is a simplified block diagram of a genericized data model management system implemented in accordance with an embodiment of the invention. In certain embodiments, a genericized data model management system 120 may be implemented to receive a stream of data 204 from a particular data source 202. In these embodiments, the data source 202 may be a user, a device, such as a user device, a system, a network, a physical facility, a data store, or a service, such as a service operating in a cloud environment. In certain embodiments, the genericized data model management system 120 may include a data preprocessor 206 module and a data transformation 210 module. In certain embodiments, the data preprocessor 206 module is implemented to preprocess the stream of data 204 to identify entity information and event information 208.

As used herein, an entity broadly refers to something that exists as itself, whether physically or abstractly. In certain embodiments, an entity may be an individual user, a group, an organization, a government, an item, a device, a system, a network, a domain, an operation, a process, a service, a geographical location, or a physical facility. As used herein, entity information broadly refers to information associated with a particular entity. In various embodiments, the entity information may include certain types of content. In certain embodiments, such content may include text, unstructured data, structured data, graphical images, photographs, audio recordings, video recordings, biometric information, and so forth. In certain embodiments, the entity information may include metadata. In various embodiments, the metadata may include entity attributes, which in turn may include certain attribute types, as described in greater detail herein.

As used herein, an event broadly refers to an action or activity enacted by an entity. Examples of such events include making a phone call, sending a text or email, using a device, accessing a system, and entering a physical facility. Other examples of events include uploading, transferring, downloading, or modifying data. Yet other examples of events include interactions between two or more users, interactions between a user and a device, interactions between a user and a network, and interactions between a user and a resource. In certain embodiments, the resource may include a physical facility, a system, a data store, or a service, such as a service operating in a cloud environment. Skilled practitioner of the art will recognize that many such examples and embodiments are possible. Accordingly, the foregoing is not intended to limit the spirit, scope or intent of the invention.

As used herein, event information broadly refers to information associated with a particular event. In various embodiments, the event information may include certain types of content. In certain embodiments, such content may include text, unstructured data, structured data, graphical images, photographs, audio recordings, video recordings, and so forth. In certain embodiments, the entity information may include metadata. In various embodiments, the metadata may include event attributes, which in turn may include certain attribute types, as described in greater detail herein.

In certain embodiments, the genericized data model management system 120 may include a genericized data model 122. As used herein, a genericized data model 122 broadly refers to a data model that defines general relational types, together with the kinds of things, such as entities and events, which may be related by such a general relational type. As an example, a genericized data model 122 may include generic entity types, such as "individual thing," "class," "relationship," and various subtypes, such as attribute types. To continue the example, individual things may be an instance of a generic entity, such as "individual thing," or an associated subtype.

In certain embodiments, the genericized data model 122 is implemented to generalize entity information and event information 208 that may be heterogeneous or disparate, yet substantively similar in concept. In various embodiments, such heterogeneous or disparate entity information and event information 208 may be respectively merged into a particular mode. As used herein, a mode broadly refers to a single relational type, familiar to skilled practitioners of the art, which includes data from substantively similar data sources. In certain embodiments, a data source may be associated with a particular mode when its corresponding entity information and event information 208 conforms to the genericized data model 122.

As an example, email and chat are both examples of communication media. However, the content of email and chat messages tend to be different. More particularly, chat events tend to be short, informal, and not threaded, whereas email messages can be long, formally structured, and threaded. Likewise, chat and email events tend to match lexicons at different rates. For example, 20 out of 100 chat events may match a profanity lexicon, while emails may only match 2 out of 100 events. As a result, the feature percentile associated with a chat event matching the lexicon may be lower (e.g., 0.8) and higher (e.g., 0.98) for an email event. As used herein, a feature represents a distinctive aspect of an element that is being modified. Accordingly, for the purposes of this disclosure, feature percentile broadly represents a numeric value associated with a mathematical relationship between two elements.

As another example, print events and file upload events may be merged into a single mode. While these two events may appear to be quite different, they may likewise share the same types of data fields. Furthermore, they may occur at similar enough frequency and volumes, and similar enough content, they are suitable for being analyzed together. However, their corresponding data fields may have different naming conventions, formats, and structure, all of which may be transformed to conform to a genericized data model. Accordingly, certain embodiments of the invention reflect an appreciation that implementation of such a genericized data model can assist in implementing, maintaining, and extending business logic associated with various domains.

In certain embodiments, a particular mode may include certain required fields. As used herein, required fields broadly refer to certain data fields within a data stream 204 containing information associated with a particular entity, a particular event, or combination thereof, necessary for processing such information to conform to the structure of the genericized data model 122. As an example, such required fields may include data fields associated with entity roles, event attributes, and so forth, described in greater detail herein.

In certain embodiments, a particular mode may be consistently considered by certain security analytics operations. As used herein, the phrase "consistently considered" broadly refers to a mode being used in the same manner, with the same intent, in various security analytics operations, described in greater detail herein. As used herein, a security analytics operation broadly refers to an operation involving the processing of entity and event information 208 conforming to the genericized data model 122 to identify a possible security breach, whether such a breach occurs intentionally or unintentionally.

In various embodiments, entity information may include entity role information. As used herein, entity role information broadly refers to information associated with an entity's behaviors, rights, expectations, norms, authorities and obligations. As an example, an email exchange between two users would involve a sender role and a recipient role. It will be appreciated that the roles of the two users may likely be reversed in subsequent email exchanges. As another example, a user presenting authorization credentials (e.g., a pass card) for access to their place of employment would involve an employee role. In certain embodiments, an entity's roles may be achieved, ascribed, permanent, temporary, situational, conditional, presumed, or transitory.

In certain embodiments, the entity role information may be used to perform one or more security analytics operations. In certain embodiments, such security analytics operations may include an entity count operation, a numeric field operation, a role cardinality aggregation operation, a relationship event feature operation, an entity resolution operation, an entitlements operation, or combination thereof. As used herein, an entity count operation broadly refers to a security analytics operation involving the use of numeric data associated with one or more entities.

In certain embodiments, the numeric data may include the number of entities associated with a particular event. In certain embodiments, the number of entities associated with an event is aggregated during the occurrence of the event. As an example, an email may initially be received by three different entities, who in turn respectively forward the email to 14 additional recipients. In this example, an entity count operation may be performed to determine there were a total of 17 recipients of the email. In certain embodiments, the entity count operation may utilize a Boolean operator, such as "true" or "false" to perform the statistical analysis.

As used herein, a numeric field operation broadly refers to a security analytics operation analyzing one or more real-valued event features. In certain embodiments, if the number of values associated with an individual field associated with a particular event is deemed to be important and is deemed to justify a corresponding event feature, then the field may be mapped to an entity role to make use of those feature types. For the purposes of this disclosure, an event feature refers to a distinctive attribute of an event. As an example, if there are a particular number of recipients associated with an event, then "recipient" is an entity role.

As used herein, a secondary role cardinality aggregation operation broadly refers to a security analytics operation where event models can be configured to score entity time periods according to the number of unique entities in another entity role that the primary entity interacts with, across the set of events matching the model's event filter. For the purposes of this disclosure, an event model refers to a representation of a particular event occurring in response to an associated action. For the purposes of this disclosure, an entity time period refers to a period of time during which a first entity interacts with a second entity. Examples of such an operation include the number of unique printers that a user prints to, the number of unique recipients that a sender emails, or the number of unique devices that a user has failed logins to.

As used herein, a relationship event feature operation broadly refers to a security analytics operation involving a new, or rare, relationship event feature. For the purposes of this disclosure, a relationship event feature represents a distinctive feature associated with a particular type of relationship event. In certain embodiments, a rare relationship event operation may extract a categorical feature value from events corresponding to the tuple of entities within a particular group of entities. In certain embodiments, a new relationship event operation may assign a value of 1 if the entity tuple has never been seen before. In certain of these embodiments, an estimation of the probability of such relationships occurring is calculated.

As used herein, an entity resolution operation broadly refers to resolving an alias for a particular entity. In various embodiments, a resolved entity may be mapped to an entity role and not an event attribute. As used herein, an entitlements operation broadly refers to assigning an event-based entitlement to a particular entity or mode. In certain embodiments, entitlements are not applied to arbitrary subgroups of events.

In certain embodiments, entity information may include entity attribute information, entity feature information, or a combination thereof. As used herein, entity attribute information broadly refers to structured information associated with a particular entity. In certain embodiments, entity attribute information may include one or more attribute types, described in greater detail herein.

As used herein, entity feature information broadly refers to information commonly used to perform analysis operations associated with entity models. As likewise used herein, an entity model broadly refers to a representation of the interrelationship of two or more entities, described in greater detail herein. In certain embodiments such analysis operations may generate scenario scores. In certain embodiments, such entity scores may be generated directly from a particular data source 202. In certain embodiments, such entity scores may be indirectly generated by using a manually-defined mapping from entity attribute values to entity feature values. As an example, if attribute Location=Baltimore, then feature Location Risk=4.

In certain embodiments, event information may include event attribute information. As used herein, event attribute information broadly refers to structured information associated with a particular event. In certain embodiments, event attribute information may include one or more attribute types. As used herein, an attribute type broadly refers to a class of attributes, such as a Boolean attribute type, a double attribute type, a string attribute type, a date attribute type, and so forth. In certain embodiments, as used herein, a Boolean attribute type broadly refers to a type of Boolean operator, familiar to those of skill in the art, associated with a particular entity or event. In certain embodiments, a Boolean event attribute type may be a biconditional Boolean event attribute having values of "true" and "false" As an example, it may be more efficient to assign attribute values of "true" or "false" to an event data field named "Privileges," rather than assigning the values "Privileged" and "Nonprivileged." In certain embodiments, a Boolean attribute type broadly refers to a type of Boolean operator, familiar to those of skill in the art, associated with a particular entity or event. Known examples of such Boolean operator types include conjunction, disjunction, exclusive disjunction, implication, biconditional, negation, joint denial, and alternative denial.

As used herein, a double attribute type broadly refers to a type of attribute that includes a numeric value associated with a particular entity or event. In certain embodiments, a double attribute type may be implemented for the performance of range searches for values, such as values between 10 and 25. In certain embodiments, a double attribute type may be implemented to configure numeric data field features, such as identifying unusually high or unusually low numeric values. In certain embodiments, a double attribute type may be implemented to create event models that aggregate by the max or sum of various event attribute values. Skilled practitioners of the art will recognize that many such embodiments are possible. Accordingly, the foregoing is not intended to limit the spirit, scope or intent of the invention.

As used herein, a string attribute type broadly refers to a type of attribute that includes a string of characters associated with an entity or an event. In certain embodiments, a string attribute type may include text characters, numeric values, mathematical operators (e.g., '+', '*', etc.), or a combination thereof. As an example, a string attribute may for an entity data field named "Participants" may include the character string "2 hosts+3 assistants+37 attendees." In certain embodiments, a string attribute type may be implemented to search for partial matches of a particular value, such as a reference to a "java" file.

As used herein, a date attribute type broadly refers to a type of attribute that contains a natural date associated with an entity or an event. In certain embodiments, the representation or format of a particular date (e.g., Mar. 15, 2018, 3/15/2018, etc.), or time (e.g., 1:07 PM, 13:07:23, etc.) is a matter of design choice. In certain embodiments, a date attribute type may be implemented to perform searches for a particular date, a particular time, or a combination thereof. In certain embodiments, a date attribute type may be implemented to perform searches for a range of dates, a range of time, or a combination thereof.

In certain embodiments, the event information may include event content information, which as used herein broadly refers to an unstructured body of text associated with a particular event. As an example, the main body of a communication, such as an email, a Short Message Service (SMS) text, a Chat communication, or a Twitter™ Tweet™ contains event content information. In various embodiments, search operations may be performed on certain event content information to identify particular information.

In certain embodiments, such search operations may include the use of Lexicon features familiar to skilled practitioners of the art. In certain embodiments such search operations may include the use of sentiment features, likewise familiar to those of skill in the art. In certain of these embodiments, extraction operations may be performed on the event content information to extract such identified information.

In certain embodiments, the event content information may be processed to generate structured data. In certain embodiments, the event content information may be processed to generate an event summary, described in greater detail herein. In these embodiments, the method by which the event content information is processed, and the form of the resulting structured data or event summary is generated, is a matter of design choice.

As used herein, event timestamp information broadly refers to time and date information associated with the time and date an event occurred. Examples of such timestamp information include the time and date an email was sent, the time and date a user logged-in to a system, the time and date a user printed a file, and so forth. Other examples of such timestamp information include the time and date a particular Data Loss Prevention (DLP) alert was generated, as well as the time and date the DLP event occurred. Yet other examples of such timestamp information include the actual time and date of a particular event, and the publically-reported time and date of the occurrence of the event. Additional examples of such timestamp information include the time and date of a meeting invite, the time and date the invite was generated, the time(s) and date(s) of any rescheduling of the meeting, or a combination thereof.

As used herein, event attachment information broadly refers to a separate body of content having an explicit association with a particular event. One example of such event attachment information includes a file. In certain embodiments, such a file may be an unstructured text file, a structured data file, an audio file, an image file, a video file, and so forth. Another example of such event attachment information includes a hypertext link, familiar to those of skill in the art, to a separate body of content. In certain embodiments, the linked body of content may include unstructured text, structured data, image content, audio content, video content, additional hypertext links, or a combination thereof.

In certain embodiments, event attachment information may be ingested for processing by the data model management system. In certain embodiments, such ingested information may be processed to identify associated entity and event information, as described in greater detail herein. In various embodiments, the event attachment information may be processed to determine certain metadata, such as the size of an attached file, the creator of the event attachment information, the time and date it was created, and so forth. In certain embodiments, search operations may be performed on the event attachment information to identify certain information associated with a particular event.

As used herein, event reference information broadly refers to information related to commonalities shared between two or more events. As an example, two events may have a parent/child, or chain, relationship. To further the example, the sending of a first email may result in the receipt of a second email. In turn, a third email may be sent from the receiver of the second email to a third party. In this example, the event reference information would include the routing information associated with the first, second and third emails, which form an email chain.

In certain embodiments, event information may be processed to generate an event summary. As used herein, an event summary broadly refers to a brief, unstructured body of text that summarizes certain information with a particular event. In certain embodiments, the event summary may summarize information associated with an event. As an example, the subject line of an email may include such an event summary. In certain embodiments, one or more event summaries may be presented to a user within a user interface (UI) 218 of the genericized data model management system 120. In various embodiments, a group of event summaries may be searched during the performance of certain security analytics operations, described in greater detail herein, to identify associated event information.

In certain embodiments, identified entity information and event information 208 is referenced to the genericized data model 122 by the genericized data model management system 120 to transform it into transformed entity data 212 and transformed event data 214. In certain embodiments, the data transformation module 210 is implemented to perform the transformation of identified entity information and event information 208 into transformed entity data 212 and transformed event data 214. In certain embodiments, the transformed entity data 212 and transformed event data 214 is stored in a security analytics data repository 216 in a form conforming to the genericized data model 122.

As used herein, a security analytics data repository 216 broadly refers to any repository of data, such as a data store familiar to those of skill in the art, containing transformed entity data 212 and transformed event data 214 conforming to the genericized data model 122. In certain embodiments, the security analytics data repository 216 may be centralized or distributed. In certain embodiments, the security analytics data repository 216 may reside on an endpoint device, such as a security appliance familiar to those of skill in the art. In certain embodiments the security analytics data repository 216 may be a subset of a data repository that may also contain information that does not conform to the genericized data model 122. Skilled practitioners of the art will recognize that many such embodiments are possible. Accordingly, the foregoing is not intended to limit the spirit, scope or intent of the invention.

In certain embodiments, the transformed entity data 212 and transformed event data 214 stored in the security analytics data repository 216 may be used by a security analytics system 118 to perform certain security analytics operations, described in greater detail herein. In certain embodiments, the genericized data model management system 120 and the security analytics system 118 may share a unified UI 218. In certain embodiments, the UI 218 may include certain UI conveniences to facilitate the operation and management of the genericized data model management system 120 and the security analytics system 118 by a security administrator 220.

As used herein, user interface UI conveniences broadly refer to the presentation of the results of certain security analytics operations. In certain embodiments, transformed entity data 212 and transformed event data 214 stored in the repository of security analytics data 216 is used to present such results to a user, such as a security administrator 220, in a user-friendly manner within a UI 218. In certain embodiments, a search bar may be implemented within the UI 218 to facilitate searching for one or more entities. In certain embodiments, such searches are facilitated through the use of an autocomplete feature when searching for entity names. In certain embodiments, the search may be executed across all entity role fields.

In certain embodiments, a visualization of certain entity and event activities over a particular interval of time may be presented within the UI 218. In certain embodiments, a comparative timeline may be presented within the UI 218 to provide visualizations of particular entities involved in certain events. In certain embodiments, event summaries for certain entities may be presented within the UI 218.

In certain embodiments, an entities search page is implemented within the UI 218 to allow users to search for lists of entities by name or by attribute. In certain embodiments, a field having associated metadata suitable for use as an entity attribute may be mapped to an entity role, thereby enabling extended search capabilities. In certain embodiments, an entity profile page is implemented within the UI 218, providing a user, such as a security administrator 220, to take notes, view and edit attributes, and see targeted visualizations.

Figure 3:
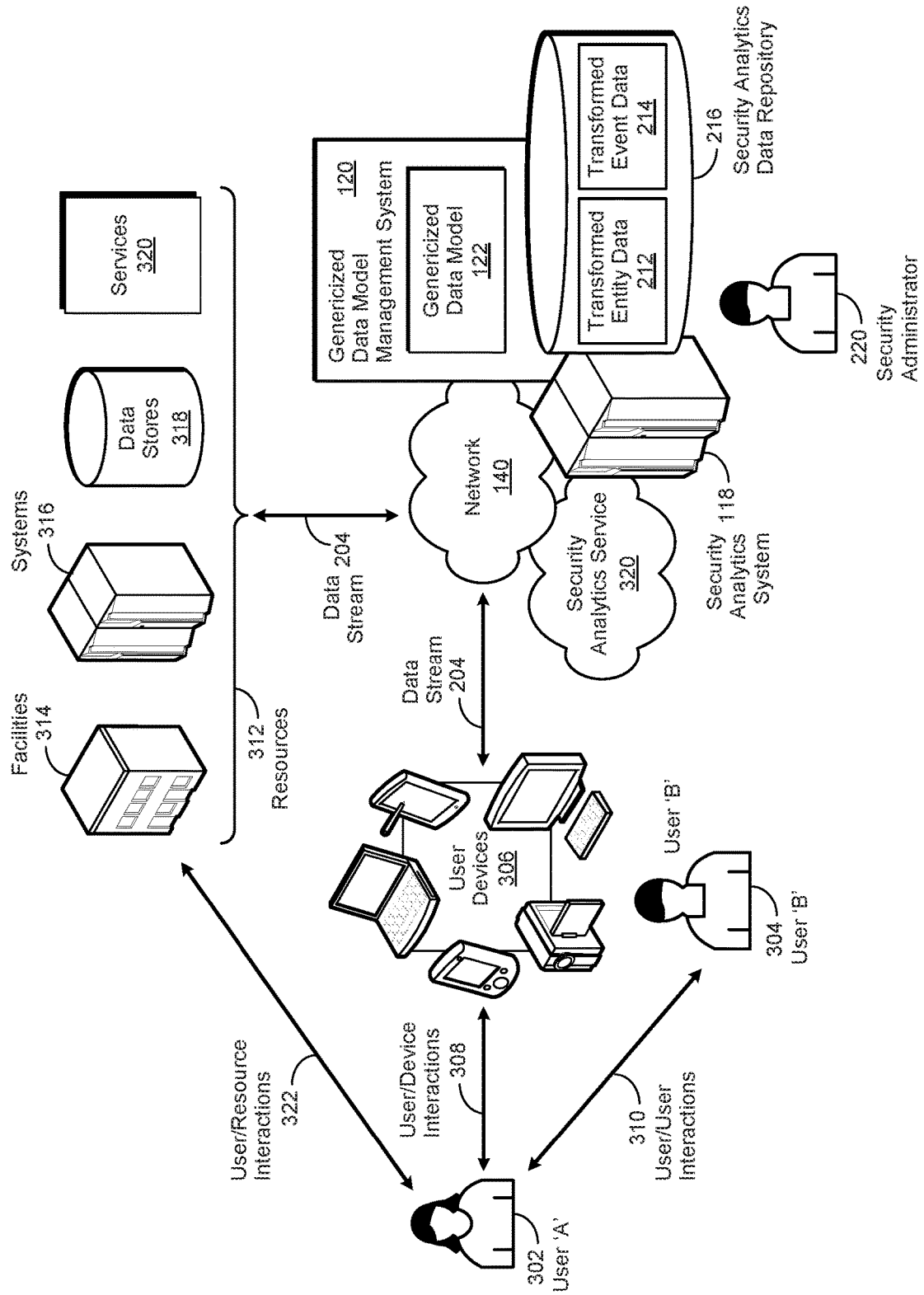
FIG. 3 is a simplified block diagram showing the performance of genericized data model security analytics operations.

FIG. 3 is a simplified block diagram showing the performance of genericized data model security analytics operations implemented in accordance with an embodiment of the invention. In this embodiment, genericized data model security analytics operations are begun by a genericized data model management system 120 receiving a data stream 204 from a data source. In certain embodiments, the data stream 204 is received by the genericized data model management system 120 via a network 140. In certain embodiments, the data source may be a device, such as a user device 306, or a resource 312.

A user device 306, as used herein, refers to an information processing system such as a personal computer, a laptop computer, a tablet computer, a personal digital assistant (PDA), a smart phone, a mobile telephone, a digital camera, a video camera, or other device that is capable of storing, processing and communicating data. In various embodiments, the communication of the data may take place in real-time or near-real-time. As an example, a cellular phone conversation may be used to communicate information in real-time, while an instant message (IM) exchange may be used to communicate information in near-real-time. In certain embodiments, the communication of the information may take place asynchronously. For example, an email message may be stored on a user device 306 when it is offline. In this example, the information may be communicated to its intended recipient once the user device 306 gains access to a network 140. In certain embodiments, a resource 312 may be a physical facility 314, a system 316, a data store 318, or a service 320, such as a service operating within a cloud environment.

Once a data stream 204 is received by the genericized data model management system 120, it is processed to identify entity data and event data, described in greater detail herein. In certain embodiments, the entity data is associated with a particular entity, such as user 'A' 302 or user 'B' 304. In certain embodiments, the entity may be a resource 312. In certain embodiments, the event information may be associated with a user/device 308 interaction, a user/user 310 interaction, or a user/resource 322 interaction.

In certain embodiments, user/device 308 interactions include an interaction between a user, such as user 'A' 302 or 'B' 304, and a device, such as a user device 306. In certain embodiments, the endpoint device 306 is used to communicate data through the use of an internal network 140. As an example, user 'A' 302 or 'B' 304 may use a user device 306 to browse a particular web page on a news site on the Internet. In this example, the individual actions performed by user 'A' 302 or 'B' 304 to access the web page constitute a user/device 308 interaction, which in turn is associated with an event. As another example, user 'A' 302 or 'B' 304 may use a user device 306 to download a data file from a particular system 316. In this example, the individual actions performed by user 'A' 302 or 'B' 304 to download the data file likewise constitute a user/device interaction 308, which in turn is associated with an event.

In certain embodiments, user/user 310 interactions may include interactions between two or more users, such as user 'A' 302 and 'B' 304. In these embodiments, the user/user interactions 310 may be physical, such as a face-to-face meeting, via a user/device 308 interaction, a user/resource 322 interaction, or some combination thereof. As an example, user 'A' 302 may use a user device 306 to compose and send an email via network 140 to user 'B' 304. In this example, the individual actions performed by user 'A' 302 to compose and send the email, and its receipt by user 'B' 304, constitute an user/user 310 interaction, which in turn is associated with an event.

In certain embodiments, user/resource 322 interactions may include interactions with various resources 312. In certain embodiments, the resources 312 may include facilities 314 and systems 316, either of which may be physical or virtual, as well as data stores 318 and services 320. As an example, user 'A' 302 may use a user device 306 to upload a file to a particular system 316. In turn, user 'B' may likewise use a user device to download the file from the system 316. In this example, the individual actions performed by user 'A' 302 to upload the file, and its subsequent actions performed by user 'B' 304 to download the file, constitute user/resource 322 interaction, which in turn are associated with an event.

Identified entity data and event data is then transformed by the genericized data model management system 120, as described in greater detail herein, into transformed entity data 212 and transformed event data 214, conforming to the structure of a genericized data model 122. In certain embodiments, the resulting transformed entity data 212 and transformed event data 214 is then stored in a security analytics data repository 216.

In certain embodiments, the transformed entity data 212 and transformed event data 214 stored in the security analytics data repository 216 is used to perform certain security analytics operations, described in greater detail herein. In certain embodiments, the security analytics operations may be performed by a security analytics system 118. In certain embodiments, the security analytics operations may be performed by a security analytics service 320. In certain embodiments, either the security analytics system 118 or the security analytics service 320, or a combination thereof, may administered by a security administrator 220.

Figure 4:
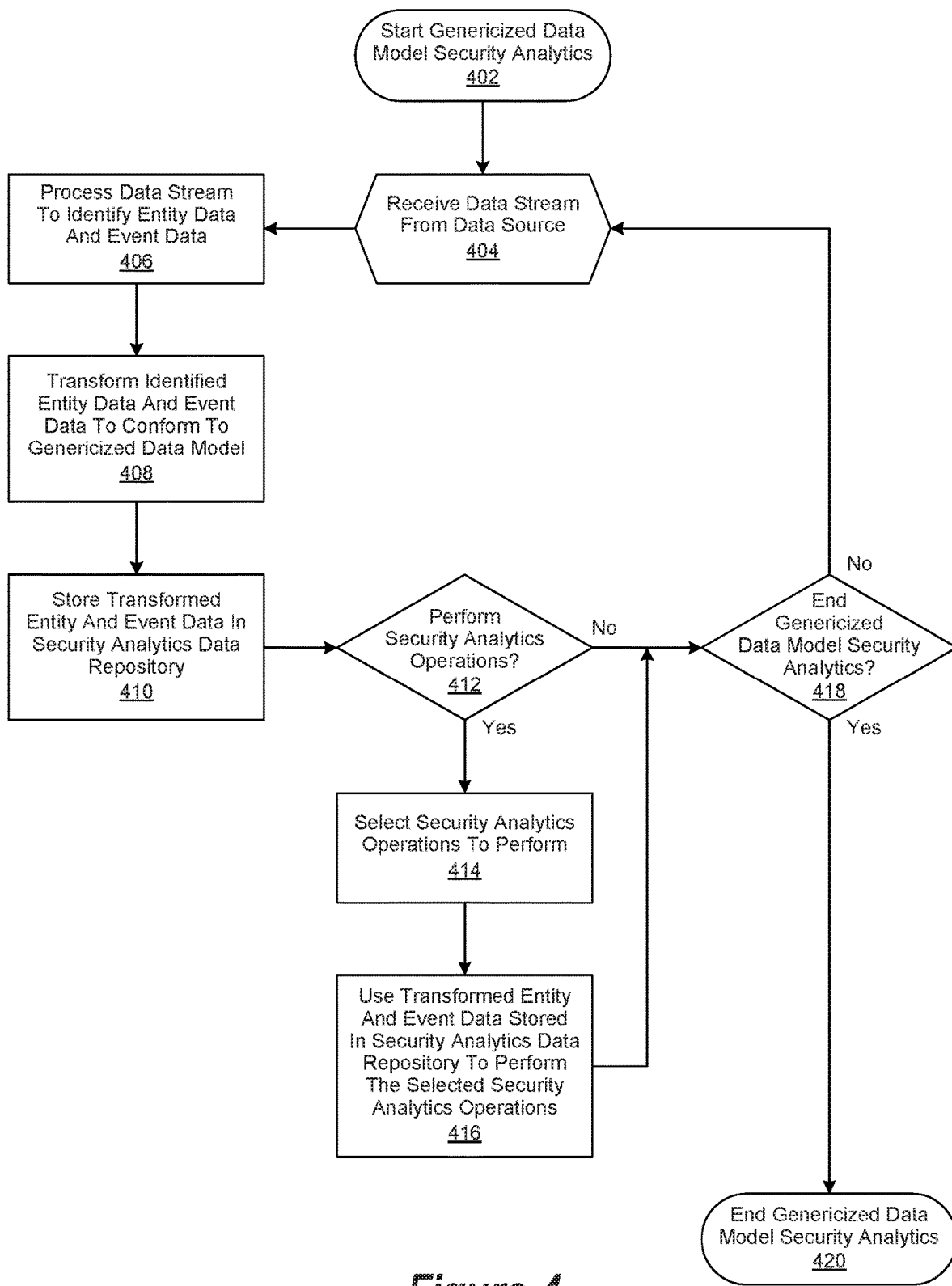
FIG. 4 is a generalized flowchart showing the performance of genericized data model security analytics operations.

FIG. 4 is a generalized flowchart showing the performance of genericized data model security analytics operations implemented in accordance with an embodiment of the invention. In this embodiment, genericized data model security analytics operations are begun in step 402, followed by ongoing operations being performed in step 404 to receive a data stream from a data source. Once a data stream is received in step 404, it is processed in step 406 to identify entity data and event data, described in greater detail herein. The identified entity data and event data is then transformed in step 408, as likewise described in greater detail herein, to conform to the structure of a genericized data model.

Then, in step 410, the resulting transformed entity data and event data is stored in a security analytics data repository, followed by a determination being made in step 412 whether to perform security analytics operations. If so, then the security analytics operations to be performed are selected in step 414. The transformed entity data and event data stored in the security analytics data repository is then used in step 416 to perform the selected security analytics operations.

Once the selected security analytics operations are performed in step 416, or if it was determined in step 412 not to perform such operations, a determination is made in step 418 whether to end genericized data model security analytics operations. If not, the process is continued, proceeding with step 402. Otherwise, genericized data model security analytics operations are ended in step 420.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implemented method for performing security analytics, comprising:
    receiving a stream of data from a data source, the stream of data representing electronically-observable interactions by a user, the electronically-observable interactions being observed through at least one of an electronic device, a computer system and a software application executing on the computing system;
    preprocessing the stream of data to identify entity information and event information from the stream of data, the entity information comprising heterogeneous entity information, the event information comprising heterogeneous event information, the preprocessing being performed by a data preprocessor module of a genericized data model management system;
    transforming the entity information into transformed entity data and the event information into transformed event data, the transforming conforming to a genericized data model, the genericized data model comprising a data model that defines a general relational type along with at least one of an entity and event related by the general relational type, the transforming being performed by a data transformation module of a genericized data model management system;
    storing the transformed entity data and the transformed event data in a security analytics data repository; and,
    performing a security analytics operation on the transformed entity data and the transformed event data, the security analytics operation being performed by a security analytics system executing on a hardware processor, the security analytics operation accessing the transformed entity data and the transformed event data from the security analytics data repository, the security analytics operation processing the transformed entity data and the transformed event data to identify a possible security breach.

2. The method of claim 1, wherein:
    the storing the transformed entity data and the transformed event data comprises associating the data source with a mode, the data source being associated with a particular mode, the particular mode comprising a set of required fields, the set of required fields comprising data fields within the stream of data containing information associated with at least one of a particular entity and a particular event for processing the entity information and the event information to conform to the genericized data model, the particular mode being consistently considered by the security analytics operation.

3. The method of claim 1, wherein:
    the transformed entity data comprises entity role information; and,
    the security analytics operation performs at least one of a plurality of security analytic operations using the entity role information, the plurality of security analytics operations comprising an entity count operation, a numeric field operation, a secondary role cardinality aggregation operation, a relationship event feature operation, an entity resolution operation, and an entitlements operation.

4. The method of claim 1, wherein:
    the transformed entity data comprises entity attribute information and entity feature information.

5. The method of claim 1, wherein:
    the transformed event data comprises event attribute information, the event attribute information comprising structured information about an event; and,
    the event attribute information comprises an event attribute type, the event attribute type comprising at least one of a Boolean attribute type, a double attribute type, a string attribute type, and a date attribute type.

6. The method of claim 1, wherein:
    the transformed event data comprises at least one of event content information, event timestamp information, event attachment information and event reference information.

7. A system comprising:
    a processor;

a data bus coupled to the processor; and
a computer-usable medium embodying computer program code, the computer-usable medium being coupled to the data bus, the computer program code used for performing security analytics and comprising instructions executable by the processor and configured for:
receiving a stream of data from a data source, the stream of data representing electronically-observable interactions by a user, the electronically-observable interactions being observed through at least one of an electronic device, a computer system and a software application executing on the computing system;
preprocessing the stream of data to identify entity information and event information from the stream of data, the entity information comprising heterogeneous entity information, the event information comprising heterogeneous event information, the preprocessing being performed by a data preprocessor module of a genericized data model management system;
transforming the entity information into transformed entity data and the event information into transformed event data, the transforming conforming to a genericized data model, the genericized data model comprising a data model that defines a general relational type along with at least one of an entity and event related by the general relational type, the transforming being performed by a data transformation module of a genericized data model management system;
storing the transformed entity data and the transformed event data in a security analytics data repository; and,
performing a security analytics operation on the transformed entity data and the transformed event data, the security analytics operation being performed by a security analytics system executing on a hardware processor, the security analytics operation accessing the transformed entity data and the transformed event data from the security analytics data repository, the security analytics operation processing the transformed entity data and the transformed event data to identify a possible security breach.

8. The system of claim 7, wherein:
the storing the transformed entity data and the transformed event data comprises associating the data source with a mode, the data source being associated with a particular mode, the particular mode comprising a set of required fields, the set of required fields comprising data fields within the stream of data containing information associated with at least one of a particular entity and a particular event for processing the entity information and the event information to conform to the genericized data model, the particular mode being consistently considered by the security analytics operation.

9. The system of claim 7, wherein:
the transformed entity data comprises entity role information; and,
the security analytics operation performs at least one of a plurality of security analytic operations using the entity role information, the plurality of security analytics operations comprising an entity count operation, a numeric field operation, a secondary role cardinality aggregation operation, a relationship event feature operation, an entity resolution operation, and an entitlements operation.

10. The system of claim 7, wherein:
the transformed entity data comprises entity attribute information and entity feature information.

11. The system of claim 7, wherein:
the transformed event data comprises event attribute information, the event attribute information comprising structured information about an event; and,
the event attribute information comprises an event attribute type, the event attribute type comprising at least one of a Boolean attribute type, a double attribute type, a string attribute type, and a date attribute type.

12. The system of claim 7, wherein:
the transformed event data comprises at least one of event content information, event timestamp information, event attachment information and event reference information.

13. A non-transitory, computer-readable storage medium embodying computer program code for performing security analytics, the computer program code comprising computer executable instructions configured for:
receiving a stream of data from a data source, the stream of data representing electronically-observable interactions by a user, the electronically-observable interactions being observed through at least one of an electronic device, a computer system and a software application executing on the computing system;
preprocessing the stream of data to identify entity information and event information from the stream of data, the entity information comprising heterogeneous entity information, the event information comprising heterogeneous event information, the preprocessing being performed by a data preprocessor module of a genericized data model management system;
transforming the entity information into transformed entity data and the event information into transformed event data, the transforming conforming to a genericized data model, the genericized data model comprising a data model that defines a general relational type along with at least one of an entity and event related by the general relational type, the transforming being performed by a data transformation module of a genericized data model management system;
storing the transformed entity data and the transformed event data in a security analytics data repository; and,
performing a security analytics operation on the transformed entity data and the transformed event data, the security analytics operation being performed by a security analytics system executing on a hardware processor, the security analytics operation accessing the transformed entity data and the transformed event data from the security analytics data repository, the security analytics operation processing the transformed entity data and the transformed event data to identify a possible security breach.

14. The non-transitory, computer-readable storage medium of claim 13, wherein:
the storing the transformed entity data and the transformed event data comprises associating the data source with a mode, the data source being associated with a particular mode, the particular mode comprising a set of required fields, the set of required fields comprising data fields within the stream of data containing information associated with at least one of a particular entity and a particular event for processing the entity information and the event information to conform to the genericized data model, the particular mode being consistently considered by the security analytics operation.

15. The non-transitory, computer-readable storage medium of claim 13, wherein:

the transformed entity data comprises entity role information; and, the security analytics operation performs at least one of a plurality of security analytic operations using the entity role information, the plurality of security analytics operations comprising an entity count operation, a numeric field operation, a secondary role cardinality aggregation operation, a relationship event feature operation, an entity resolution operation, and an entitlements operation.

16. The non-transitory, computer-readable storage medium of claim 13, wherein:

the transformed entity data comprises entity attribute information and entity feature information.

17. The non-transitory, computer-readable storage medium of claim 13, wherein:

the transformed event data comprises event attribute information, the event attribute information comprising structured information about an event; and, the event attribute information comprises an event attribute type, the event attribute type comprising at least one of a Boolean attribute type, a double attribute type, a string attribute type, and a date attribute type.

18. The non-transitory, computer-readable storage medium of claim 13, wherein:

the transformed event data comprises at least one of event content information, event timestamp information, event attachment information and event reference information.

19. The non-transitory, computer-readable storage medium of claim 13, wherein the computer executable instructions are deployable to a client system from a server system at a remote location.

20. The non-transitory, computer-readable storage medium of claim 13, wherein the computer executable instructions are provided by a service provider to a user on an on-demand basis.

* * * * *